J. HIRST.

Car Brake.

No. 84,490.

Patented Dec. 1, 1868.

JOHN HIRST, OF JAMAICA, NEW YORK, ASSIGNOR TO HIMSELF AND HENRY A. DIRKES, OF NEW YORK CITY.

Letters Patent No. 84,490, dated December 1, 1868; antedated November 13, 1868.

IMPROVED CAR-BRAKE.

The Schedule referred to in these Letters Patent and making part of the same.

*To all whom it may concern:*

Be it known that I, JOHN HIRST, of Jamaica, in the county of Queens, and State of New York, have invented a new and improved Railroad-Car Brake; and I do hereby declare that the following is a full, clear, and exact description thereof, which will enable others skilled in the art to make and use the same, reference being had to the accompanying drawings, forming a part of this specification, in which—

Similar letters of reference indicate corresponding parts.

This invention relates to a new manner of arranging the brakes of a railroad-car or engine, and consists, First, in the use of an up-and-down adjustable block, which can be forced down upon the rails, it being suspended from an oscillating horizontal shaft that is turned by the brakeman. By forcing this block upon the rail, the car will be most effectually stopped. The shaft is provided with a spring or weight, by means of which the rail-brake is raised as soon as the chains operating it are slackened.

The invention also consists in arranging brake-shoes on both sides of each wheel, both shoes being simultaneously drawn towards the axis of the wheel when the brake is applied. The shoes on each side of a pair of wheels are secured to bars, as usual, the two bars being operated by one set of chains or cords, or their equivalents. The said chains or cords pass over friction-rollers, which are secured to one bar, and their ends are then secured to the opposite bar, and thus, when the chains or cords are stretched, the brakes will be simultaneously applied to both sides of the wheel.

A represents the platform of a railroad-car or engine, of ordinary or suitable construction.

B B are the wheels, mounted on their axles C C, as shown.

D is a horizontal shaft, having its bearings in studs $a\ a$, which project from the under side of the platform A.

This shaft is connected, by means of cords or chains, $b\ b$, with the upright crank-shafts E E, which are arranged at or near the end of the car, in the ordinary or suitable manner, so that by turning one of the crank-shafts, the cord or chain attached to it will be wound upon it, and the shaft D will be turned.

By means of cords or chains, $c\ c$, the shaft D is connected with brake-heads F F', of which two are arranged for each or any one pair of wheels, one on each side of the same. The cords $c$ are fastened with their ends to that brake-head, F, which is nearest to the shaft D, and pass around friction-rollers, D, which are attached to the opposite brake-head, F'.

Thus, as the shaft D is turned by the brakeman, the chains or cords $c$ draw the bars F F' towards each other, and the brake-shoes G, attached to the same, are consequently pressed against the edges of the wheels from opposite sides of the wheels. Without requiring more power to actuate the brakes, the same will still be applied with double power, as each wheel receives two brake-shoes instead of one, as usual.

The shaft D is provided with cranks, $d\ d$, to which rods $e\ e$ are pivoted, as shown.

Figure 1:
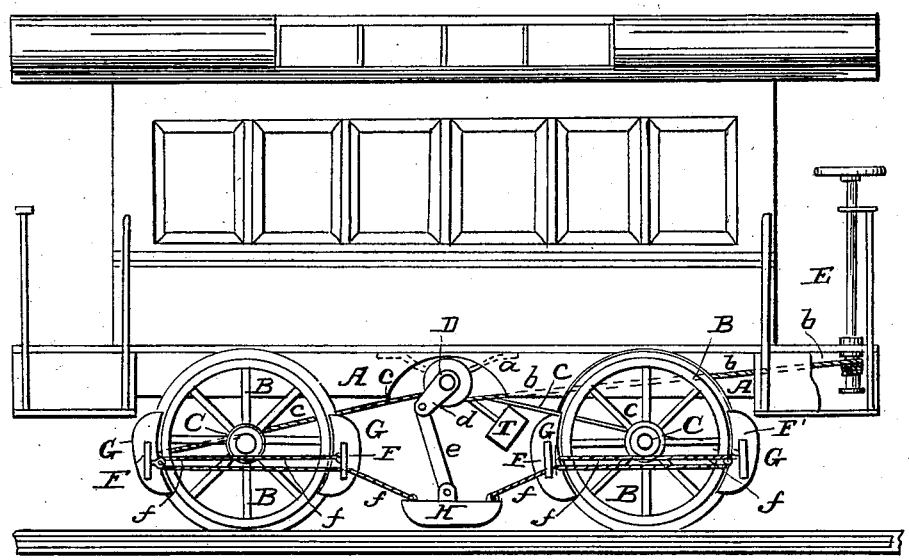
Figure 1 represents a side elevation of a railroad-car provided with my improved brake.
Figure 2:
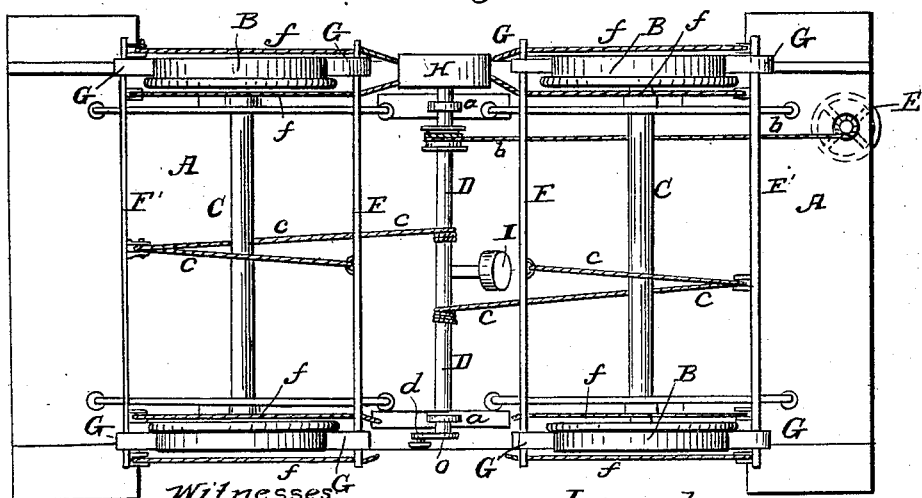
Figure 2 represents an inverted plan view of the same.

To the lower ends of the rods $e$ are pivoted shoes H, which, when the brake is to be applied, are forced upon the surface of the rails, as shown in fig. 1.

A weight, I, or its equivalent, secured to the shaft D, has the tendency to raise the shoe H again, as soon as the cords $c$ are slackened.

It is evident that either the shoes H or the shoes G, or both combined, may be attached to one car. In the latter case, the ends of the shoes H may be balanced by means of cords $f\ f$, which are attached with their ends to the head F and shoe H, and which pass over friction-rollers on the heads F', as shown in fig. 1.

The lugs $a$ may be fastened to springs, as shown, so that the shaft D may be in yielding bearings.

Having thus described my invention,

What I claim as new, and desire to secure by Letters Patent, is—

1. The rail-brake shoe H, attached by the connecting-bar $e$ to the crank $d$ of the weighted shaft D, hung in spring-bearings $a$, said shoe being supported in a horizontal position, by means of the cords $f$, all constructed, arranged, and operating as described, for the purpose specified.

2. The combination of the brakes G G, heads F F', crank-shaft D, weight I, cords or chains $b\ c$, rail-brake shoe H, connecting-bar $e$, and supporting-cords or chains $f$, all constructed and arranged to operate as herein described, for the purpose specified.

JOHN HIRST.

Witnesses:
WM. F. MCNAMARA,
ALEX. F. ROBERTS.